United States Patent
Yamaoka et al.

[11] Patent Number: 6,042,170
[45] Date of Patent: Mar. 28, 2000

[54] LIGHT VEHICLE

[75] Inventors: Naoji Yamaoka; Katsumi Kohama; Toshiyuki Hakuno; Teruaki Yoshida; Toshiyuki Higashi, all of Sayama, Japan

[73] Assignee: Honda Giken Kogyo Kabushiki Kaisha, Tokyo, Japan

[21] Appl. No.: 08/910,320

[22] Filed: Aug. 13, 1997

[30] Foreign Application Priority Data

Aug. 23, 1996 [JP] Japan .................................. 8-222464
Aug. 29, 1996 [JP] Japan .................................. 8-229082

[51] Int. Cl.$^7$ .............................................. B62D 25/10
[52] U.S. Cl. ................................. 296/76; 292/303
[58] Field of Search ........................ 296/37.1, 76, 195, 296/203.04; 180/210; 292/303, 203

[56] References Cited

U.S. PATENT DOCUMENTS

| | | | |
|---|---|---|---|
| 3,186,746 | 6/1965 | Attwood et al. | 292/303 |
| 3,661,419 | 5/1972 | Mitamura et al. | 296/195 |
| 5,228,741 | 7/1993 | Ide | 296/203.04 |

FOREIGN PATENT DOCUMENTS

| | | | |
|---|---|---|---|
| 843034 | 6/1939 | France | 296/37.1 |
| 850524 | 12/1939 | France | 296/37.1 |
| 948253 | 7/1949 | France | 296/76 |
| 88377 | 3/1990 | Japan | 296/37.1 |
| 3-16888 | 1/1991 | Japan . | |
| 3-25090 | 2/1991 | Japan . | |
| 405139352 | 6/1993 | Japan | 180/210 |

*Primary Examiner*—Dennis H. Pedder
*Attorney, Agent, or Firm*—Merchant & Gould P.C.

[57] ABSTRACT

A light vehicle includes a lid that is pivotable about a hinge, provided at the rear end of the lid, for opening and closing a rear trunk. Locking members are provided at the front end of the lid, which are releasably engageable with roof-supporting struts. Thus, the lid can be moved to a fully open position without being interfered by the presence of the struts, which allows the rear trunk to be operated and used with increased ease. The seat, including a seating section and a back rest section integrally formed together, has an inclined lower surface that is superposed on an inclined upper surface of a rear cowl. Thus, rearward force applied to the seat when the vehicle starts moving or accelerating is divided to allow the seat to be firmly pressed downward.

3 Claims, 10 Drawing Sheets

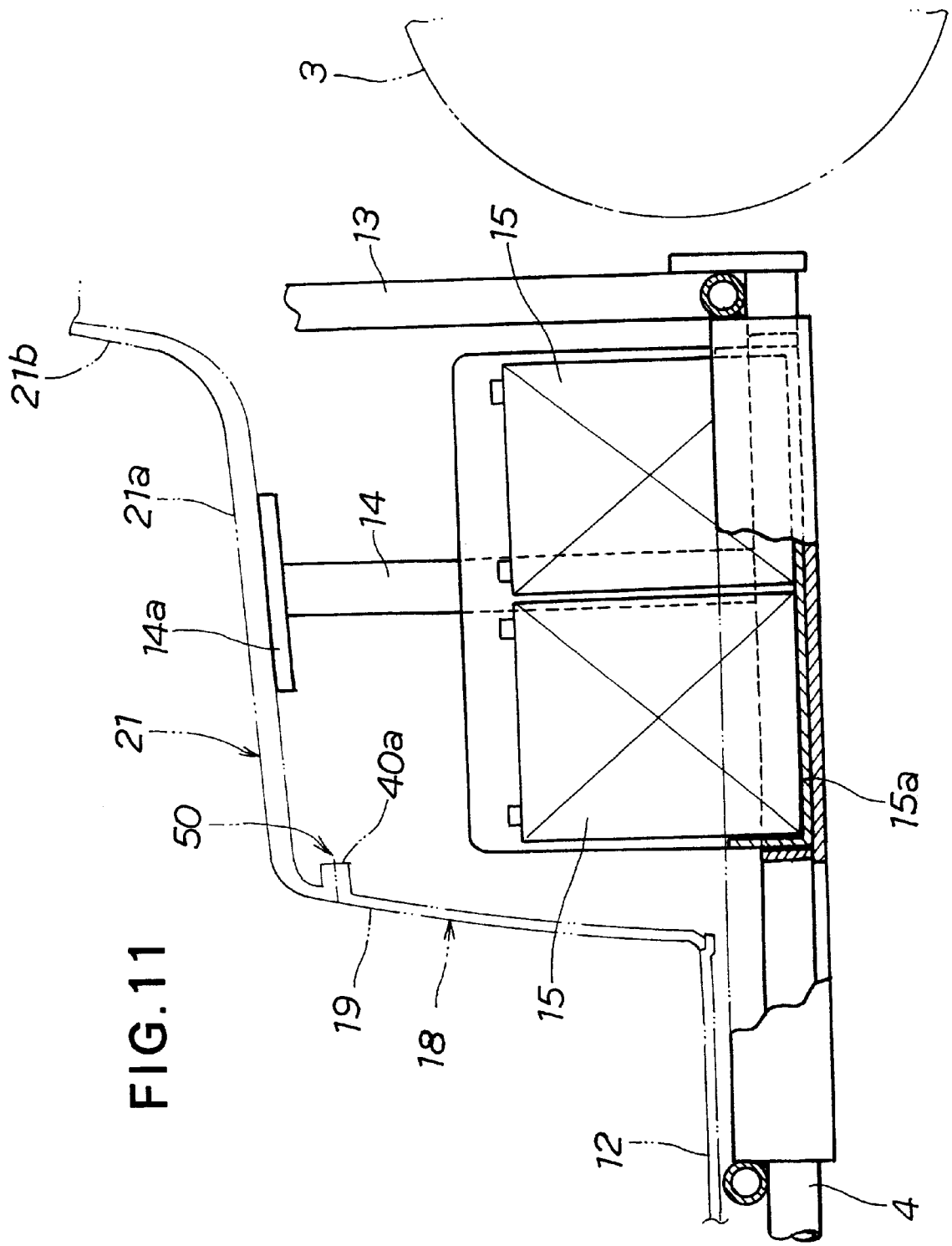

LIGHT VEHICLE

BACKGROUND OF THE INVENTION

1. Field of the Invention

The present invention relates generally to light vehicles such as three-wheeled automotive vehicles. More particularly, the present invention relates to an improved light vehicle which has a roof fixedly supported on struts extending upward from the vehicle body and also has an improved seat-supporting mechanism.

2. Description of the Related Art

A light vehicle provided with a roof is disclosed in, for example, Japanese Patent Laid-open Publication No. HEI-3-25090. The disclosed light vehicle is a three-wheeled automotive vehicle having a single front wheel mounted on a front portion of the vehicle body, a pair of rear wheels mounted on rear portions of the vehicle body, and a rear trunk fixed to a rear end portion of the vehicle body. The rear trunk is in the form of a box or case that is normally covered with an openable lid. A roof support member is mounted on a front portion of the rear trunk widthwise of the vehicle, and the vehicle roof is fixedly supported on a U-shaped roof stay fixed to the top of the roof support.

In this disclosed conventional light vehicle, the rear trunk lid is pivotally connected to the upper end of the trunk body by means of a hinge, so as to open and close the trunk. Specifically, the lid is coupled at its front end to the front end of the trunk body by means of a metal locking member such as a conventional buckle-like fastener. Thus, as the lid is moved about the hinge to a trunk-opening position, it undesirably contacts vertical roof-supporting struts, which would make it difficult to move the lid to a sufficiently open position. Thus, luggage or other objects can not be put in or out of the trunk easily, which would lead to poor usability of the trunk. Further, because the lid requires the rear metal locking in addition to the front hinge, the locking mechanism for the lid would undesirably become complicated in structure. Therefore, it has been felt that significant improvements should be made to provide a simplified lid locking mechanism for use in the light vehicle.

Japanese Patent Laid-open Publication No. HEI-3-16888 discloses another light vehicle, but this publication and the above-discussed HEI-3-25090 publication both fail to show details of a seat structure for the light vehicles.

In many of the conventional seat supporting mechanism for two-wheeled vehicles, a seat supporting frame, such as a seat post or seat rail, is mounted on main frames, and a seat bottom plate is pivotably attached at one end thereof to the support frame and detachably attached at the other end thereof to the support frame. However, these conventional seat supporting mechanisms are not satisfactory in many ways. First, they are constructed of a number of component parts, making the overall structure too complicated. Also, they require many assembly steps, thus requiring very cumbersome and time-consuming assembly work. Further, the seat supporting mechanism including a hinge and a seat rest must have sufficient rigidity and mechanical strength, because the seat has to be frequently moved to open and close a small compartment provided thereunder, where fuel- and oil-feeding tanks are located, such as for supplying fuel or oil to the corresponding tank and because the seat is subjected to relatively great forward/rearward force or jolt when the vehicle starts moving, accelerating or decelerating.

Where an electric three-wheeled automotive vehicle is employed, a heavy battery, as an electric power source, is preferably provided at a low level on the vehicle, in order to lower the center of gravity of the vehicle and keep good weight balance in the forward/rearward direction of the vehicle. It is also preferable that the heavy battery be located centrally in the forward/rearward direction of the vehicle and particularly underneath the seat on which the driver's (and other passenger's) weight rests.

However, in such light vehicles where the heavy battery is located underneath the seat, maintenance or other work on the battery can not be carried out easily, particularly if the fuel-feeding tank is provided underneath the seat and the seat is pivoted about the hinge for refueling as in the conventional light vehicles equipped with an internal combustion engine. Furthermore, it is extremely difficult to perform maintenance on a battery that is located deep under the hinged seat.

Therefore, in the light vehicles carrying the battery at a low level thereof, it is desirable that the seat be openable as fully as possible, be easily attached and detached, be simple in structure, and be supported reliably.

SUMMARY OF THE INVENTION

A first aspect of the present invention provides a light vehicle including a roof and a rear trunk, which comprises: a roof-supporting strut provided in a front portion of an opening formed in the rear trunk, so as to support thereon the roof; a lid for the rear trunk that is hinged to a rear end of a wall of the trunk surrounding the opening; and a locking member provided at a front end of the lid for releasable engagement with the roof-supporting strut.

Because the lid is hinged at its rear end for pivotal movement to open and close the rear trunk and the front end portion of the lid is releasably engaged with the roof-supporting strut via the locking member, the lid can be moved to a fully open position to thereby allow luggage or sundry objects to be easily put in and out of the trunk without being interfered by the strut. This allows the rear trunk to be easily operated and used very effectively (throughout its available space). Further, the light vehicle uses the roof-supporting strut as part of the locking mechanism for the lid, so that it is possible to substantially simplify the locking mechanism, only requiring the locking member to be provided on the lid.

With the arrangement that the locking member is provided on the lid for releasable engagement with the roof-supporting strut, the lid can be easily locked in predetermined trunk-opening and trunk-closing positions and also can be easily unlocked from these positions. This facilitates user's operation of the lid, including the operation to lock the lid in the trunk-closing position.

Preferably, the locking member is a resilient member having a U-shape as viewed in plan. In this case, the lid can be readily locked resiliently in a reliable and stable condition, by just pushing the locking member onto the roof-supporting strut. The locking mechanism can be simplified, requiring only the U-shaped member and the strut.

Further, a seat is preferably disposed below and forwardly of the roof-supporting strut, and a partition wall member is disposed below the roof-supporting strut between the seat and the rear trunk. The partition wall member is fixedly supported under the roof-supporting strut. The partition wall member between the seat and the trunk can be fixed reliably under the bottom of the strut. This eliminates a need to extend a partition-wall-member supporting frame to a predetermined place between the seat and the trunk and hence can simplify the framework. Further, because the partition wall member is fixed under the bottom of the strut, the strut adds to the rigidity of the partition wall member, and thus the wall can be reduced in thickness while maintaining the necessary rigidity. The reduced thickness allows the partition wall member to be formed to a desired shape with increased ease.

A second aspect of the present invention provides a light vehicle including a seat and a rear cowl, which comprises: the seat including a seating section and a back rest section integrally formed of synthetic resin, the seat being placed on a seat resting support of the rear cowl and having an upwardly inclined surface formed on part of an underside thereof; and the rear cowl having an upwardly inclined surface that is formed on the seat resting support and corresponds to the upwardly inclined surface of the seat.

Due to the contact between the inclined surface of the seat and the inclined surface of the seat resting support, rearward force applied to the seat when the vehicle starts moving or accelerating is directed obliquely downward and downward in combination with the driver's (and other passenger's) weight, and as a consequence, the seat is firmly pressed downward against the seat resting support. Thus, the seat can be supported and held reliably in a stable condition. Further, because the seat is just placed along its inclined surface on the inclined surface of the seat resting support rather than being joined to the resting support via a hinge or other fastener, it can be greatly simplified in structure and can also be dismounted from the resting support in a simple manner.

Further, by providing a seat post under the seating section so as to support the seating section of the seat, the seat can be reliably supported irrespective of the driver's (and other passenger's) weight. Positioning means is preferably provided on the seat and the seat resting support of the rear cowl for positioning the seat relative to the rear cowl. The positioning means allows the seat and seat resting support to be properly positioned relative to each other in a reliable manner. The positioning means may comprise a plurality of projecting portions formed on the periphery of seat's lower surface and a plurality of recessed portions formed in the seat resting support of the rear cowl at locations corresponding to those of the projections. By fitting the projecting portions into the corresponding recessed portions, the seat can be easily positioned relative to the rear cowl. Alternatively, the recessed portions may be formed in the seat's lower surface, and the projecting portions may be formed on the seat resting support.

BRIEF DESCRIPTION OF THE DRAWINGS

Preferred embodiments of the present invention will be described hereinbelow, by way of example only, with reference to the accompanying drawings, in which:

FIG. 11 is enlarged sectional view showing a battery provided underneath the seat.

DETAILED DESCRIPTION OF THE PREFERRED EMBODIMENTS

The following description is merely exemplary in nature and is in no way intended to limit the invention or its application or uses.

Figure 1:
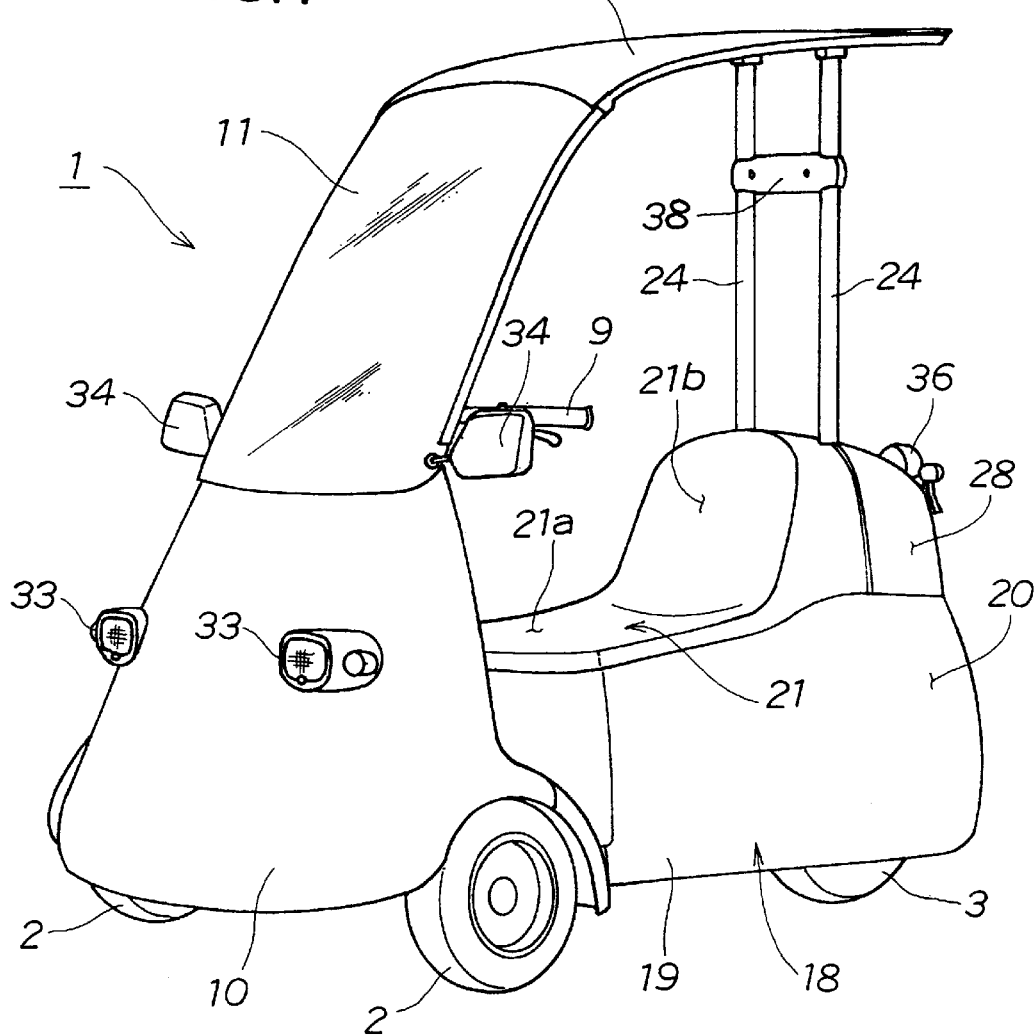
FIG. 1 is a perspective view of a three-wheeled automotive vehicle embodied as an example of a light vehicle according to the present invention.
Figure 2:
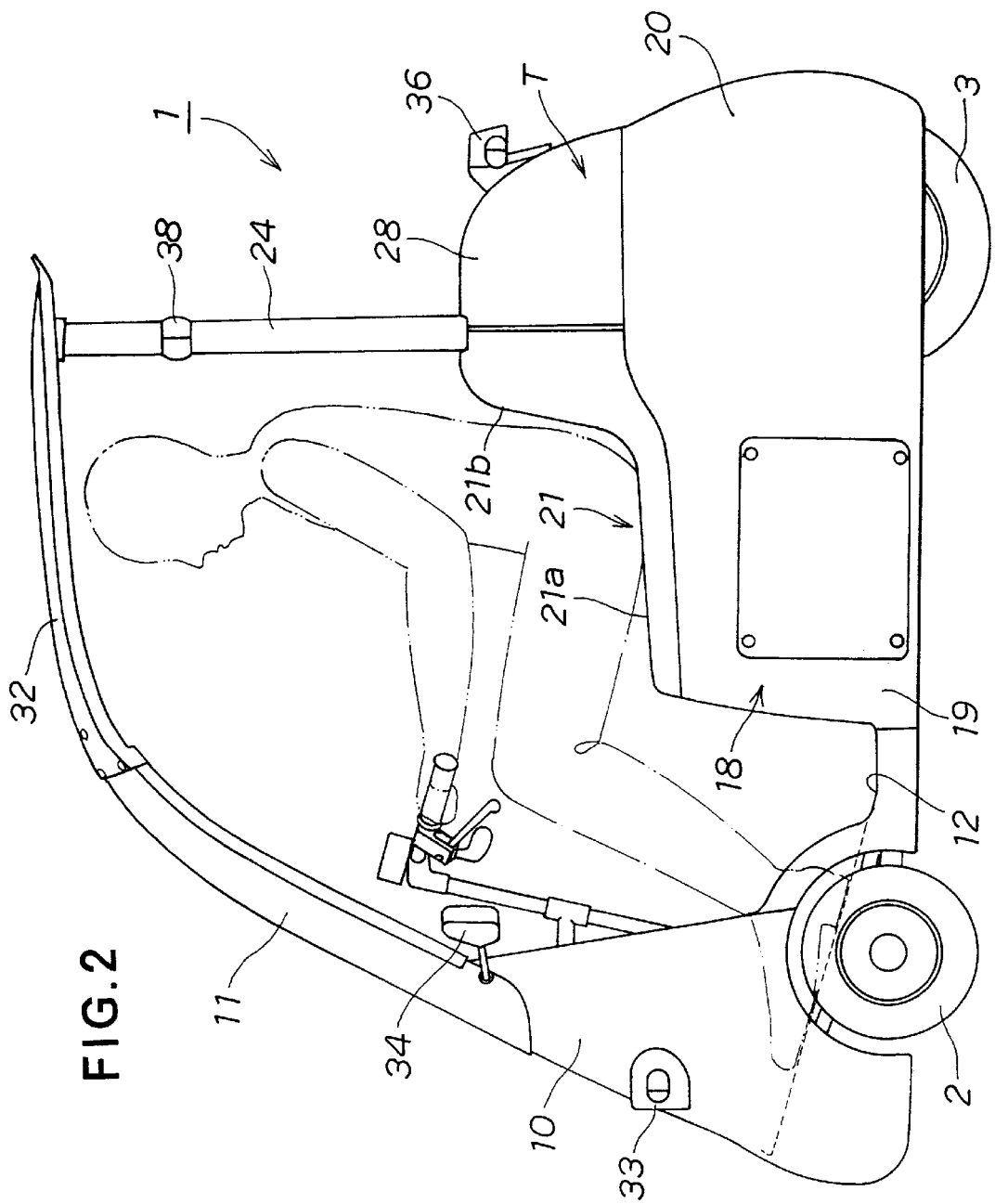
FIG. 2 is a side view of the three-wheeled automotive vehicle shown in FIG. 1.
Figure 3:
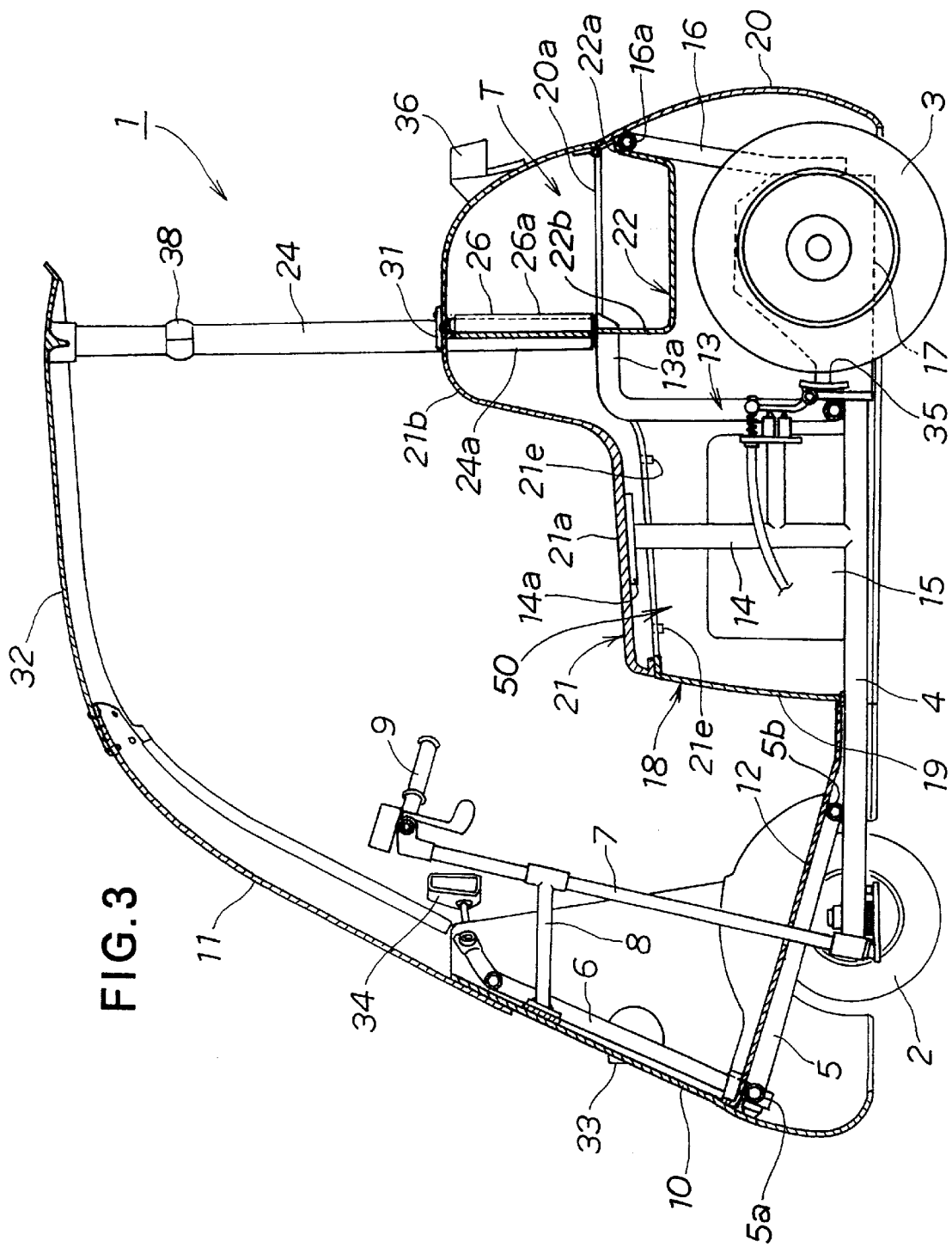
FIG. 3 is a vertical sectional view of the three-wheeled automotive vehicle.

In FIGS. 1 to 3, reference numeral 1 represents a three-wheeled automotive vehicle embodied as an example of a light vehicle according to the present invention. The three-wheeled automotive vehicle in this embodiment is a motor scooter, although the present invention can be applied to light vehicles driven by an internal combustion engine as well as electromotive vehicles such as the one illustrated here. Further, whereas the present invention will be described hereinbelow in relation to the three-wheeled automotive vehicle with a pair of front wheels and a single rear wheel, it may also be applied to a three-wheeled automotive vehicle with a single front wheel and a pair of rear wheels and to a four-wheeled automotive vehicle with two pairs of front and rear wheels.

The three-wheeled automotive vehicle generally designated by reference numeral 1 is provided with a pair of front wheels 2 and a single rear wheel 3. The three-wheeled automotive vehicle 1 includes a pair of left and right main frames 4 extending in the front/rear direction of the vehicle 1. A pair of left and right front frames 5 are joined to front portions of the respective main frames 4 and extend forward and obliquely upward therefrom. These main frames 4 and front frames 5 are each in the shape of a pipe. The front frames 5 are interconnected by two cross members 5a and 5b in the front and rear end portions thereof.

Front cowl stay 6 is fixed to the front ends of the two front frames 5 and extends upward therefrom to support a front cowl 10 of the vehicle 1. The front cowl stay 6 has a stay piece 8 extending rearward to support a steering column 7 that is fixedly mounted and extends upward from between the front ends of the main frames 4. Steering shaft (not shown) is rotatably disposed within the steering column 7 and extends vertically therethrough. Bar handle 9 is fixed to the upper end of the steering shaft so that the vehicle operator can control the front wheels by operating the bar handle 9.

The front cowl 10 surrounds the outer sides of the main frames 4, front frames 5 and front cowl stay 6. Wind shield 11 is attached to an upper portion of the front cowl 10 and extends upwardly rearward from the front cowl 10. Floor panel 12 is supported on the front frames 5 and forward portions of the main frames 4. A pair of left and right rear frames 13, each substantially in an inverted-L-shape as viewed from sideways, are secured at the bottom end thereof to rearward portions of the respective main frames 4 and extend upward therefrom. Each of the rear frames 13 has an upper extension 13a bent 90° rearwardly from its upright portion. A single seat post 14 in the form of a relatively big pipe is fixedly mounted uprightly in front of the rear frames 13.

To rear end portions of the main frames 4 are coupled a front end of a power unit 17 that includes a motor for driving the rear wheel 3 of the vehicle 1. Rear stay 16 is secured to a rear end of the power unit 17 and extends upward therefrom. The rear stay 16 includes a cross member 16a extending widthwise of the vehicle 1 and has a channel-like shape. Batteries 15, power sources for the motor, are mounted on the rear half portions of the main frames 4 via left and right battery plates 15a (only one shown in FIG. 11) disposed on both sides of the seat post 14.

As best seen in FIG. 3, the rear portion of the three-wheeled automotive vehicle 1 is covered with a rear cowl 18. The rear cowl 18 has a forward half portion 19 extending upward from the rear end of the floor panel 12, and a rearward half portion 20 formed integrally with the forward half portion 19 to cover part of the outer side and rear end of the rear wheel 3.

Figure 4:
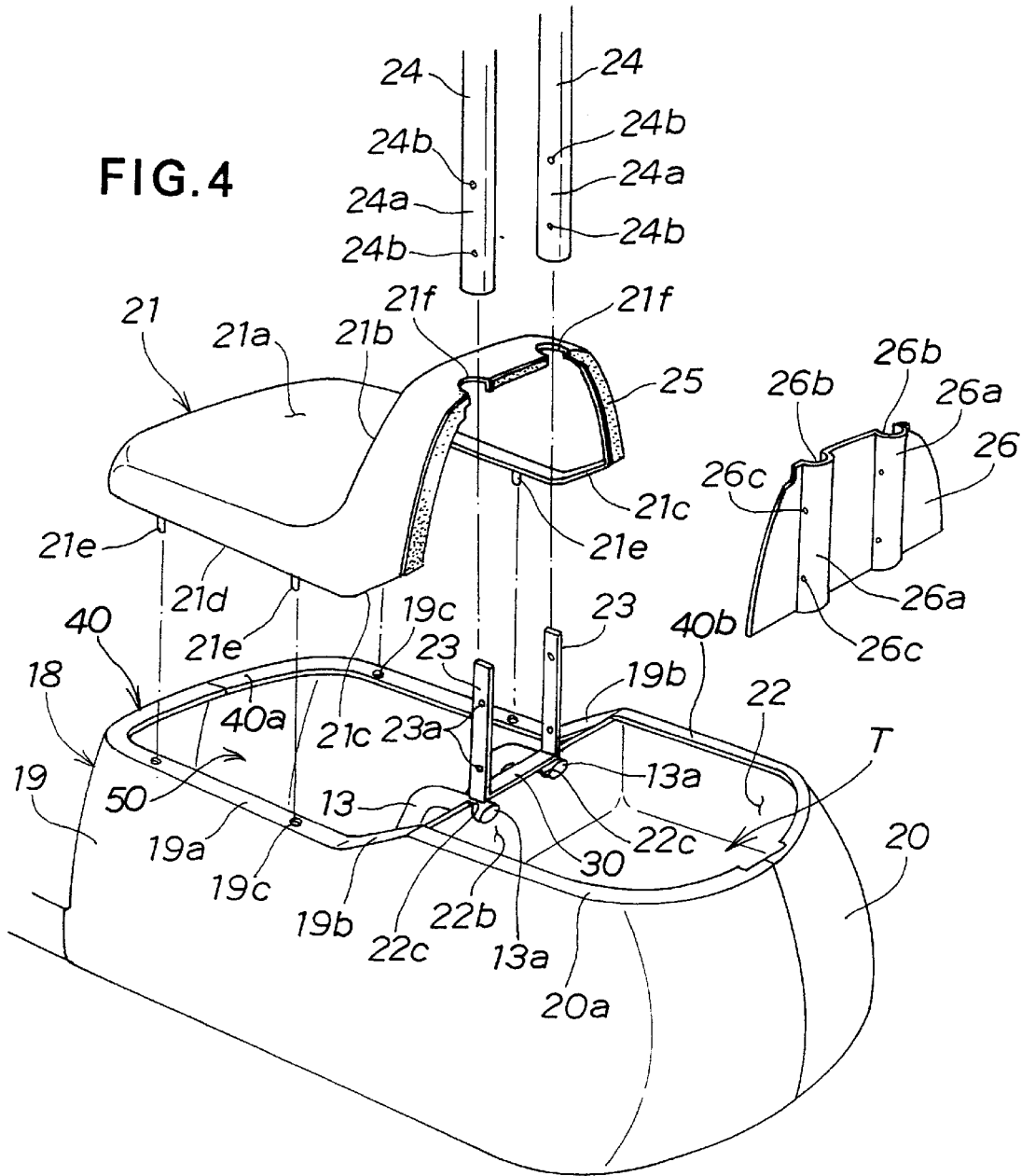
FIG. 4 is an exploded perspective view of a rear trunk and a seat mounted on a rear portion of the light vehicle.

The rear cowl 18 is generally in an oval shape as viewed in plan, whose dimension is greater in the front/rear direction than in the left/right direction of the vehicle. As shown in FIG. 4, the rear cowl 18 is open at its upper end and has a peripheral flange 40 bent toward the opening. The peripheral flange 40 has a front flange portion 40a extending generally horizontally, and a rear flange portion 40b located at a higher level than the front flange portion 40a.

The upper surface of the front flange portion 40a is formed as a generally U-shaped seat resting surface 19a, and a pair of inclined surfaces 19b extend obliquely upward from the opposite ends of the front flange portion 40a to the rear flange portion 40b, thereby continuously connecting the horizontal front flange portion 40a and the higher-level rear flange portion 40b. The rear flange portion 40b surrounds an upper end of a case 22 that forms a base of a rear trunk T for containing luggage or sundry objects as will be later described. Front end wall 22b of the case 22 serves as a partition between the forward and rearward half portions 18 and 19 of the case 22. Thus, this partition 22b separates the case 22 formed in the rearward half portion 20 of the rear cowl 18 from the forward half portion 19.

Front ends of the inclined surfaces 19b merge with the horizontal front flange portion 40a, while rear ends of the inclined surfaces 19b merge with the rear flange portion 40b that is located at a higher level than the front flange portion 40a.

Seat 21, generally L-shaped as viewed sideways, is placed on the seat resting surface 19a of the horizontal front flange portion 40a. The seat 21, which is preferably made of synthetic resin by molding, includes a seating section 21a and a back rest section 21b extending upward from the rear end of the seating section 21a. As viewed in bottom plan, the seat 21 is shaped to conform to that of the forward half portion 19 of the rear cowl 18. Both the seating section 21a and the back rest section 21b of the seat unit 2 have an inverted-U-shape in vertical section.

As further shown in FIG. 4, the back rest section 21b has a pair of inclined lower surfaces 21c that are formed to correspond to the inclined surface 19b of the aforementioned seat resting surface 19a. Namely, the seat 21 has the inclined lower surfaces 21 near the rear end thereof. Further, in the seat 21, a plurality of spaced-apart downward projections 21e are formed on each of left and right portions of the bottom surface 21d. A plurality of holes 19c are formed, in the front flange portion 40a of the rear cowl 18, for fitting engagement with the downward projections 21e of the seat 21. Thus, the seat 21 can be readily positioned properly relative to the surface 19a by just fitting the projections 21e of the seat 21 into the corresponding holes 19c. As shown in FIG. 3, the seating section 21a of the seat 21 is fixedly supported on a mounting plate 14a secured to the top of the aforementioned seat post 14.

In the rearward half portion of the rear cowl 18, the above-mentioned case 22 having a U-shaped vertical section forms a lower half of the rear trunk T for accommodating luggage or other sundry objects, as noted earlier and shown in FIG. 3. Curled portion 22a formed at the rear end of the case 22 is releasably engaged with the cross member 16a of the above-mentioned rear stay 16. The front wall 22b of the case 22 is attached to a connector plate 30 (FIG. 4) fixed between and interconnecting the rear ends 13a of the left and right rear frames 13. The case 22 is located at a lower level than the upper surface 20a of the rear flange portion 40b of the rear cowl's rearward half portion 20.

Figure 5:
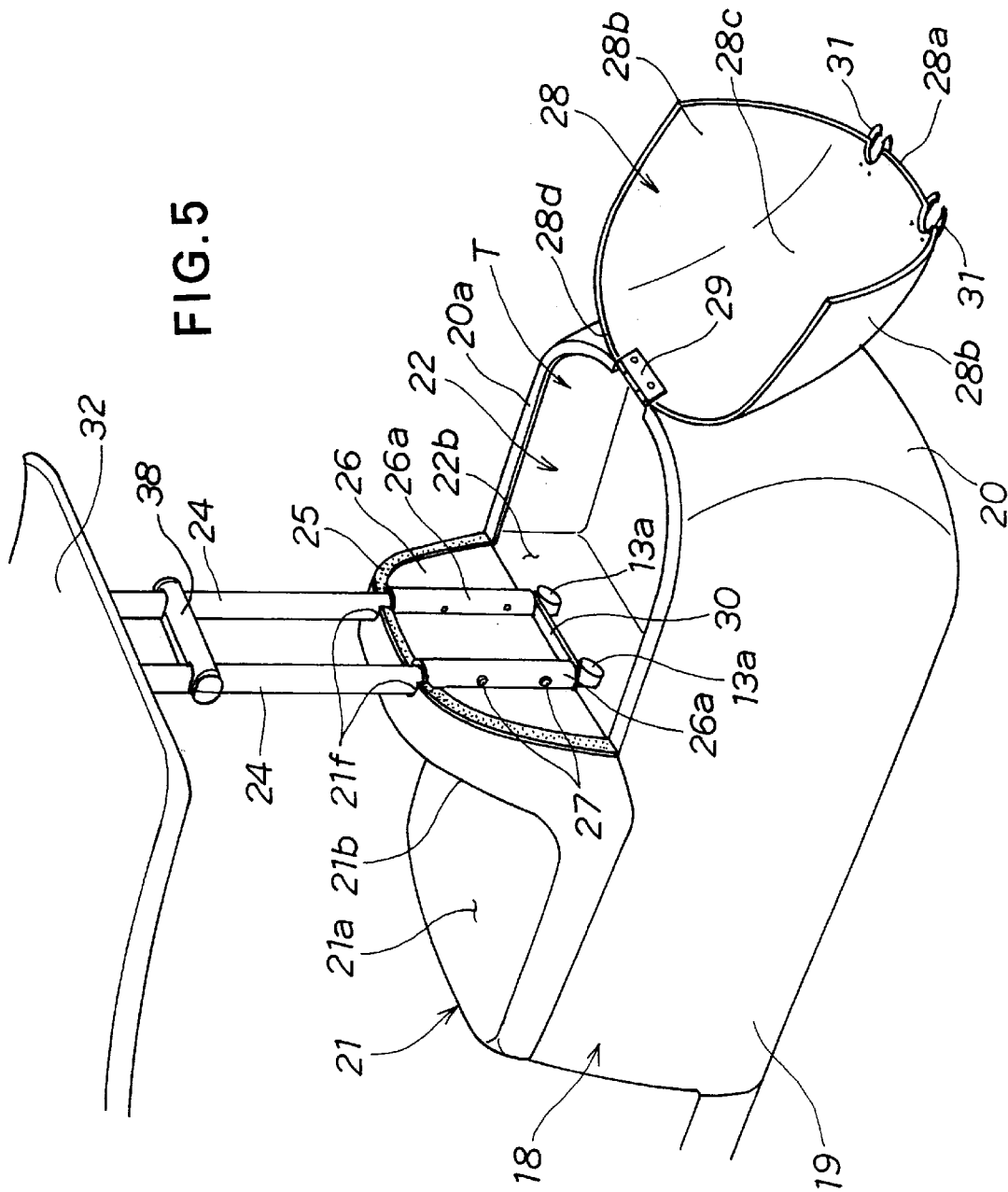
FIG. 5 is a perspective view showing the light vehicle when a vehicle roof is mounted in place, a partition wall member is secured, and a rear trunk lid is pivoted about a hinge to a trunk-opening position.

As shown in FIGS. 4 and 5, the rear ends 13a of the left and right rear frames 13 slightly project rearwardly beyond left and right recesses 22c, respectively, formed in the upper edge of the front wall 22b of the case 22. Strut stays 23 for supporting roof-supporting struts 24 are secured to the rear ends 13a of the left and right rear frames 13. Specifically, the left and right roof-supporting struts 24 are screwed at the respective lower end portions or bases 24a to the strut stays 23.

Figure 6:
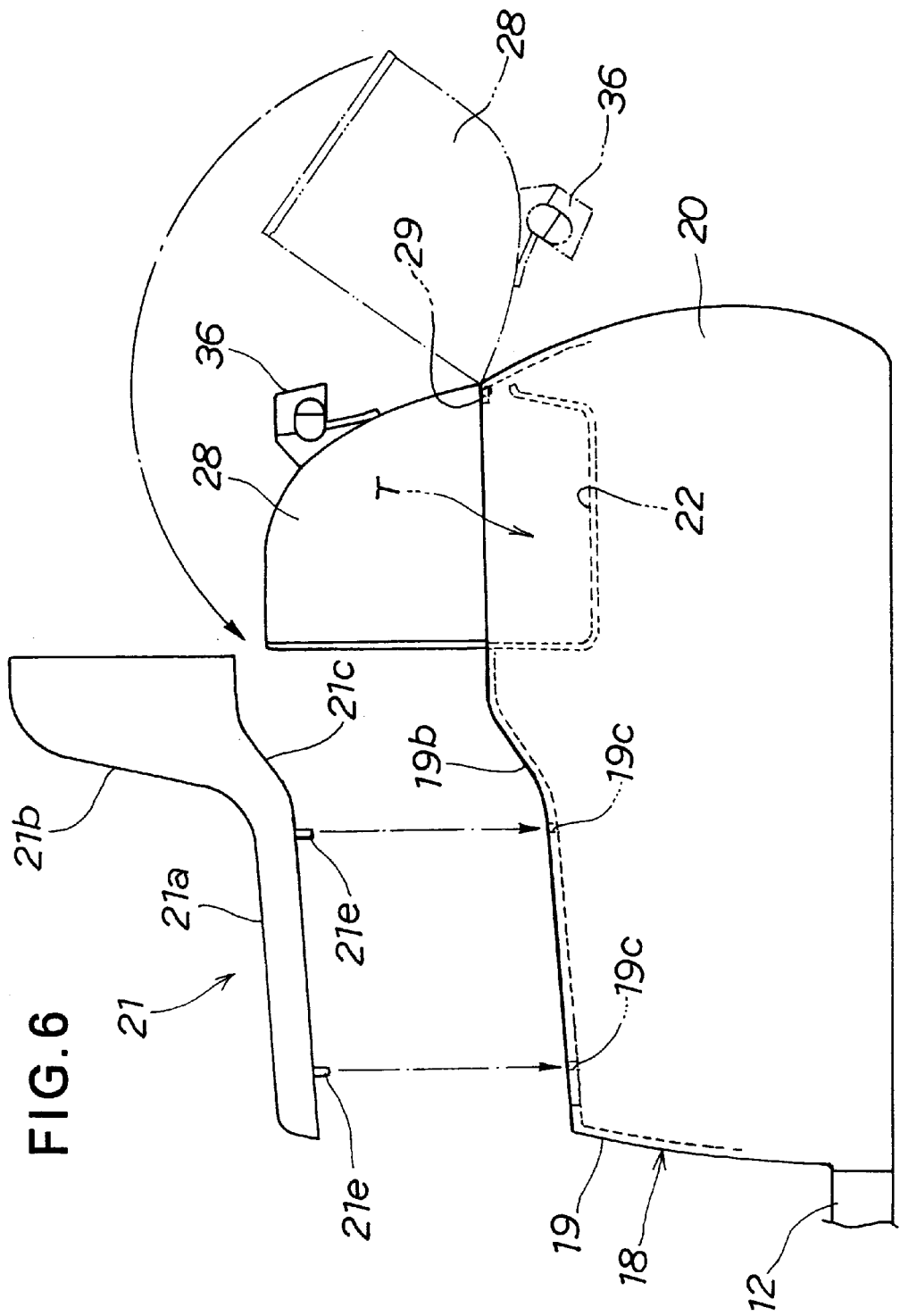
FIG. 6 is a fragmentary side view of the light vehicle, showing structural relations between the seat and a rear cowl.
Figure 8:
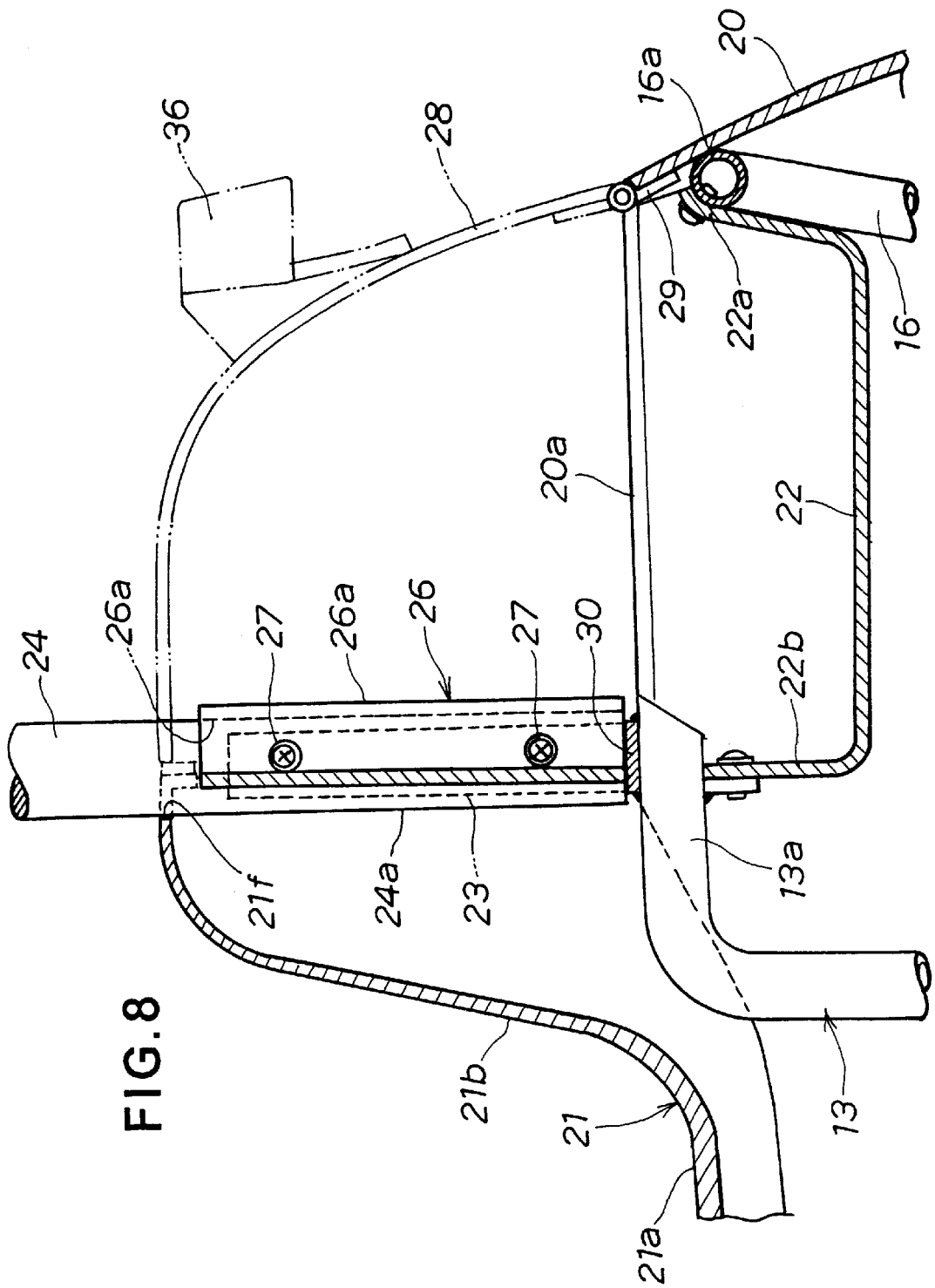
FIG. 8 is an enlarged side view, in vertical section, of the light vehicle, showing structural relations between parts of the seat and the roof-supporting strut other than those shown in FIG. 7.

In this way, the two roof-supporting struts 24 are mounted uprightly on the rear portion of the three-wheeled automotive vehicle. As shown in FIG. 8, the back rest section 21b of the seat 21 has U-shaped recesses 21f, formed in the rear side thereof, for receiving the forward half portions of the respective roof-supporting struts 24. By being thus partly received in the recesses 21f, the roof-supporting struts 24 can be more firmly supported in place, as shown in FIGS. 5 and 6. Sealing material 25 is adhered to the rear surface of the back rest section 21b of the seat 21.

As seen in FIG. 8, each of the roof-supporting struts 24 has an oval sectional shape which is longer in the front/rear direction than in the left/right direction of the vehicle 1. As noted earlier, the front half portion of each of the roof-supporting struts 24 is fitted in the corresponding recess 21f of the back rest section 21b, while the rear half portion of the strut 24 projects rearwardly through the recess 21f.

Further, in FIG. 4, reference numeral 26 represents a partition wall member having a shape conforming to the rear side of the back rest section 21b; more specifically, the partition wall member 26 is a substantially trapezoidal plate with curved side edges. The partition wall member 26 has a pair of spaced-apart vertical ridges 26a, each of which is generally U-shaped in cross section to provide a forward-facing U-shaped channel 26b. The partition wall member 26 is attached to the struts 24 in such a manner to close a rearward opening of the back rest section 21b, as shown in FIG. 5. More specifically, the rearward half portions of the struts 24 are fitted in the respective U-shaped channels 26b.

Each of the vertical ridges 26a has a plurality of side through-holes 26c formed therein so as to correspond in position to a plurality of holes 24b formed in the corresponding strut base 24a as well as a plurality of holes 23a formed in the corresponding stay 23. Thus, the partition wall member 26 and struts 24 are fastened to the stays 23 by means of screws 27 each inserted through the side through-hole 26c, hole 24b in the strut base 24a and hole 23a in the stay 23. Because the partition wall member 26 is attached to the struts 24 via the stays 23, it can be held stably in place between the rear trunk T and the seat 21.

Particularly, because the partition wall member 26 has the left and right ridges 26a as its reinforcing portions and the ridges 26a are fixed to the stays 23 by means of the screws 27 (FIG. 5), the mechanical strength and rigidity of the partition wall member 26 can be increased by the presence of the stays 23. Thus, sufficient mechanical strength and rigidity of the partition wall 26 are achieved, even where the wall member 26 is formed of a thin-thickness plate to facilitate its forming.

As best seen in FIG. 5, the rearward half portion 20 of the rear cowl 18 includes a lid 28 that covers the case 22 to form the upper half of the rear trunk T. The lid 28 is constructed in such a manner that it abuts against the sealing material 25 adhered to the rear end surface of the back rest section 21b of the seat 21 when it is placed in the position to fully cover the case 22 (trunk-closing position). The lid 28 has side wall portions 28b, and a rear wall portion 28c inclined downward toward the rear end of the vehicle 1. The lid 28 is joined, at its rear end, to the rear end upper surface of the rear cowl's rearward half portion 20 by means of a hinge 29. As shown in FIG. 6, the lid 28 is pivotable about the hinge 29 between the trunk-closing and trunk-opening positions. A tail light assembly 36 is mounted on the rear end surface of the lid 28.

Figure 9:
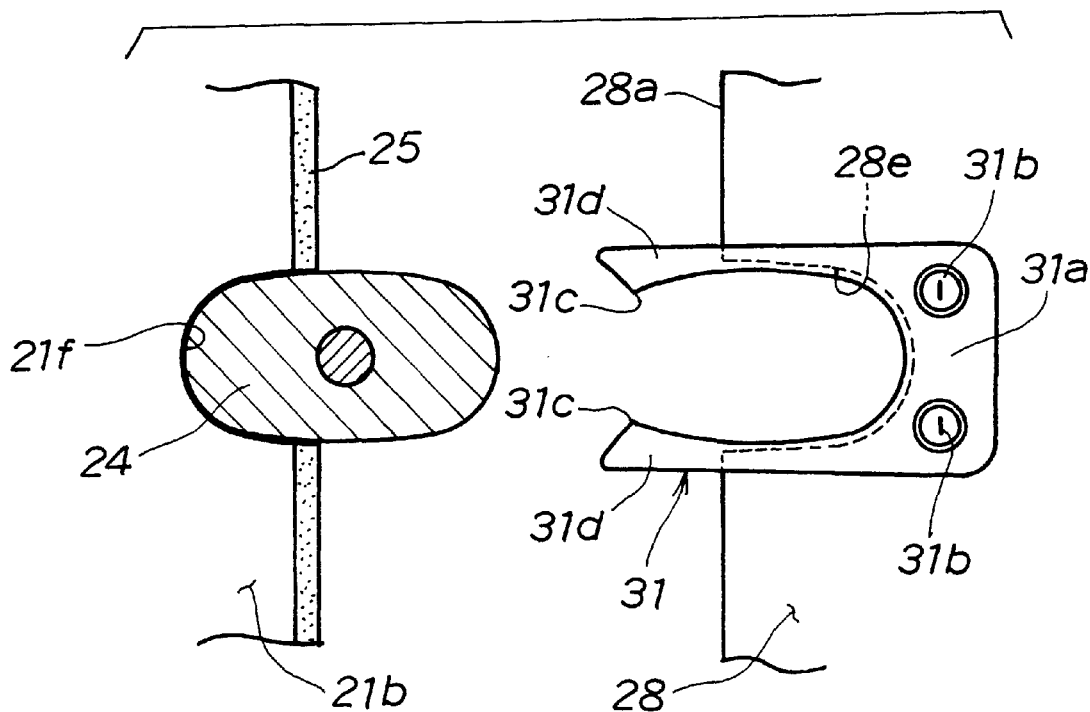
FIG. 9 is an enlarged plan view of principal parts of the light vehicle, showing a locking member of the trunk lid disengaged from the roof-supporting strut.
Figure 10:
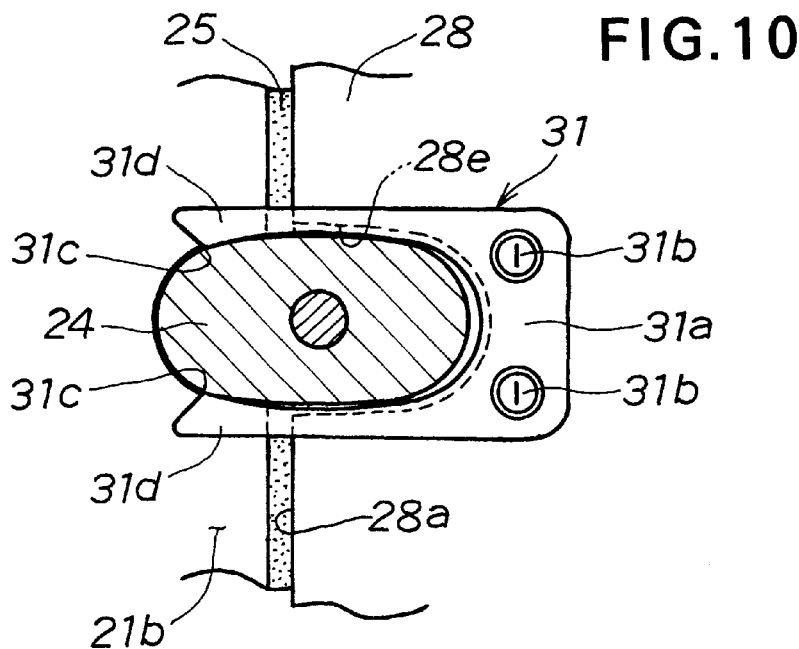
FIG. 10 is an enlarged plan view of the principal parts of the light vehicle, showing the locking member of the trunk lid engaged with the roof-supporting strut.

As shown in FIGS. 5, 9 and 10, two locking members 31, each formed as a U-shaped or bifurcated claw, are provided on a front end portion 28a of the lid 28. These locking members 31 are secured to the front end portion 28a of the lid 28 by placing them on left and right U-shaped (as viewed in plan) recessed portions formed in the end portion 28a and fastening their bases 31a to the end portion 28a by means of screws 31b. As clear from FIG. 9, each of the locking members 31 includes a pair of claw pieces 31d having chevron-shaped end projections 31c protruding inward in a symmetrical fashion and is made of a resilient material.

Figure 7:
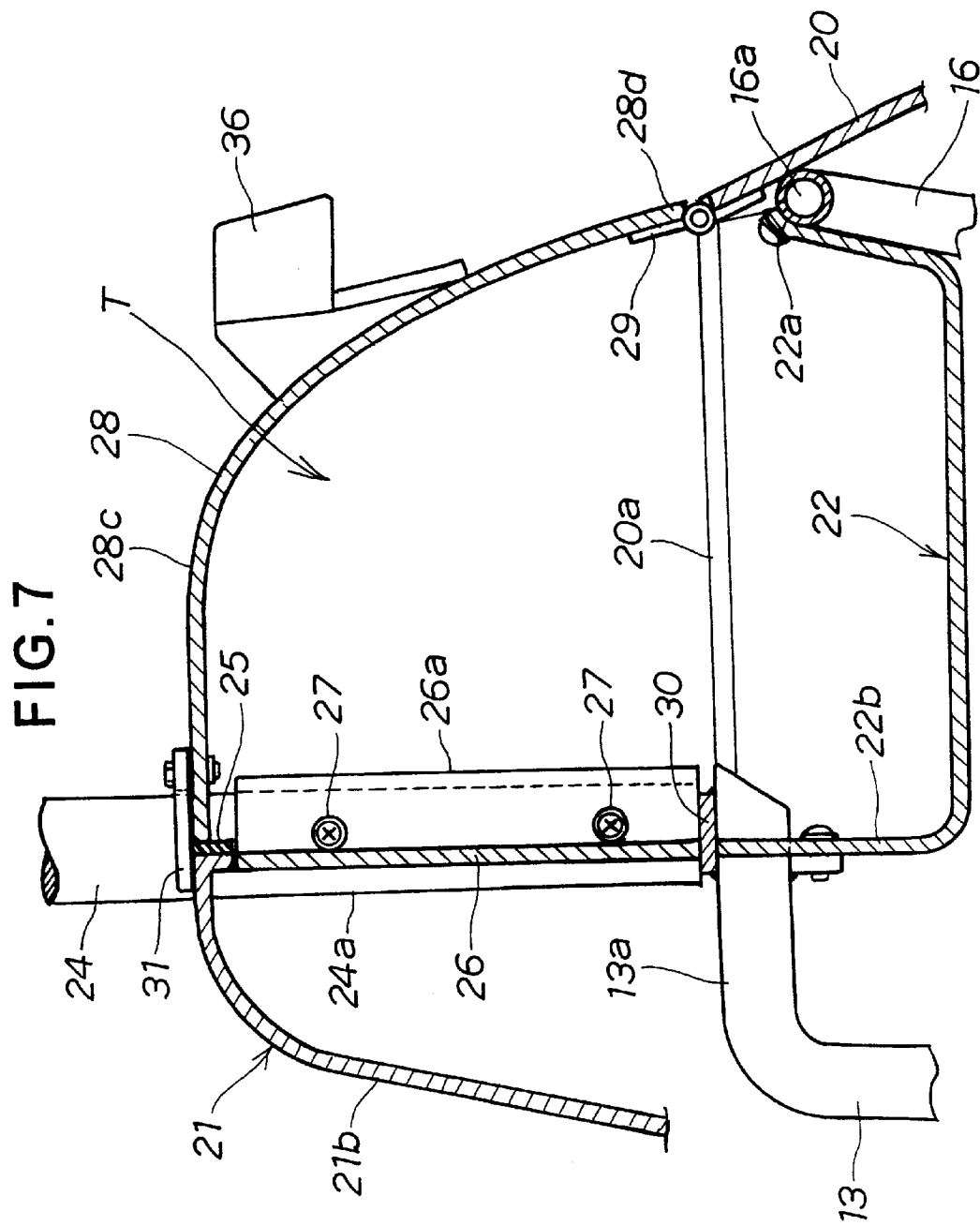
FIG. 7 is an enlarged side view, in vertical section, of the light vehicle, showing structural relations among a roof-supporting strut, the trunk lid and a rear portion of the seat.

By pivoting the lid 28 about the hinge 29 from the trunk-opening position forwardly to the trunk-closing position, the side wall portions 28b are brought into contact with the upper surface 20a of the rear cowl's rearward half portion 20 to close the case 22, so as to form the whole rear trunk T. FIG. 7 is a sectional view showing the lid 28 in the trunk-closing position.

More specifically, when the lid 28 is pivoted from the trunk-opening position, each of the locking members 31 is moved leftward from the position as shown in FIG. 9 so that the chevron-shaped end projections 31c of the claw pieces 31d come into contact with opposite sides of a rear end portion of the corresponding strut 24. As the locking member 31 is moved further leftward, the claw pieces 31d are resiliently spread wider and the end projections 31c grip the strut 24 at opposite side surfaces thereof. Ultimately, the end projections 31c of each of the locking members 31 are moved to a predetermined locking position where they resiliently grip opposite surfaces of a front end portion of the corresponding strut 24. In this manner, the lid 28 has been locked in the trunk-closing position by resilient gripping engagement between the locking members 31 and the struts 24. Thus, such resilient gripping engagement between the locking members 31 and the struts 24 allows the lid 28 to be locked in the trunk-closing position reliably in a stable condition.

The lid 28 can be moved to the trunk-opening position by pivoting it about the hinge 29 rearwardly. Namely, as the lid 28 is pivoted, each of the locking members 31 is pulled rearward against the resilient gripping force applied to the corresponding strut 24 and thereby the lid 28 is released from the locked condition. This arrangement allows the lid 28 to be easily released from the locked condition without particular cumbersome actions by a user.

As shown in FIG. 3, a vehicle roof 32 is connected at its front end to an upper end portion of the windshield 11. Rear end portion of the vehicle roof 32, extending rearward from the upper end portion of the windshield 11, is fixedly mounted on the tops of the above-mentioned struts 24. In this manner, the vehicle roof 32 is fixed relative to the body of the vehicle 1.

Referring back to FIG. 1, reference numeral 33 represents headlights, 34 represents rear-view mirrors, and 38 represents a cross beam member extending between upper portions of the struts 24 to add to the mechanical strength of the struts 24. Further, in FIG. 3, reference numeral 35 represents a brake, and the tail light assembly 36 includes a winker lamp and a brake lamp.

As shown in FIGS. 4 and 6, the seat 21 is placed on the flange portion 40a of the rear cowl's forward half portion 19 and thereby closes the opening 50 in the forward half portion 19 from above. Also, the seat 21 is appropriately positioned by fitting the projections 21e of the seat 21 into the corresponding holes 19c formed in the flange portion 40a. When the seat 21 has thus been appropriately positioned, the inclined surface 19b of the forward half portion 19 are superposed on the inclined lower surfaces 21c of the seat 21.

The following paragraphs describe operation of the seat 21 when the three-wheeled automotive vehicle starts moving or accelerating.

When the vehicle starts moving or accelerating, rearward force is applied to the seat 21. However, this rearward force or vector is divided into downward force and obliquely downward force due to the contact between the rear cowl's inclined surface 19b of the forward half portion 19 and the inclined lower surfaces 21c of the seat 21. As a consequence, the seat 21 is firmly pressed downward against the seat resting surface 19a. This arrangement eliminates a need for a complicated mechanism for coupling the seat 21 to the body of vehicle or to the rear cowl 18.

The main purpose of fitting the projections 21e into the holes 19c is to appropriately position the seat 21 as mentioned above, and force applied to the rear cowl's inclined surface 19b and the inclined lower surfaces 21c of the seat 21 does not impart a great load to the projections 21e.

Because the seat 21 is just placed on the seat resting surface 19a as described above, it can be readily dismounted from the resting surface 19a by just lifting it up. By thus dismounting the seat 21 from the rear cowl's forward half portion 19, the opening 50 in the forward half portion 19 so far closed by the seat 21 is placed in a fully open condition. Then, upper portions of the batteries 15 and associated auxiliaries are fully exposed, which facilitates maintenance of these batteries 15 and auxiliaries.

In summary, the light vehicle of the present invention allows the rear trunk T to be fully opened without being interfered by the presence of the roof supporting struts 24, even though the rear trunk T is located rearwardly of the struts 24 and includes the lid 28 for opening and closing the trunk T. Further, because the present invention uses the roof-supporting struts 24 as part of the mechanism for locking the lid 28 in the trunk-closing position, it is possible to reduce the number of component parts in the locking mechanism for the lid 28 and thereby substantially simplify the locking mechanism.

Furthermore, with the arrangement that the inclined surface 19b of the forward half portion 19 are superposed on the inclined lower surfaces 21c of the seat 21 when the lid 28 is in the trunk-closing position, rearward force applied to the seat 21 when the vehicle starts moving or accelerating is divided into downward force and obliquely downward force, so that the seat 21 is firmly pressed downward. Thus, the seat 21 can be supported and held reliably in a stable condition with a simple mechanism.

What is claimed is:

1. A vehicle including a roof and a rear trunk, said vehicle comprising:

a main frame;

a rear frame extending upwardly from said main frame;

a roof-supporting strut provided in a front portion of an opening formed in said rear trunk, extending upwardly from said rear frame connected between said rear frame and said roof so as to support thereon said roof;

a lid for said rear trunk that is hinged to a rear end of a wall of said trunk surrounding said opening; and a locking member extending forwardly of a front end of said lid for engagement with said roof-supporting strut.

2. A vehicle as recited in claim 1 wherein said locking member provided at a front end of said lid is a resilient member having a U-shape as viewed in plan.

3. A vehicle as recited in claim 1 wherein a seat is disposed below and forwardly of said roof-supporting strut, and a partition wall member is disposed between said seat and said rear trunk, and wherein said partition wall member is fixedly supported to said roof-supporting strut.

* * * * *